United States Patent

Umemura

[15] 3,646,859
[45] Mar. 7, 1972

[54] CAMERA PROVIDED WITH AUTOMATIC EXPOSURE AND BATTERY-CHECKING CIRCUITS

[72] Inventor: Yukio Umemura, Tokyo, Japan
[73] Assignee: Asahi Kogaku Kogyo Kabushiki Kaisha, Tokyo-to, Japan
[22] Filed: Jan. 20, 1971
[21] Appl. No.: 107,884

[30] Foreign Application Priority Data

Jan. 27, 1970  Japan......................................45/7842

[52] U.S. Cl. ................................95/10 CT, 95/11, 95/53 EB
[51] Int. Cl. ......................................G03b 17/18, G03b 7/08
[58] Field of Search .............95/10 C, 10 CE, 10 CT, 10 CD, 95/11, 53 R, 53 E, 53 EA, 53 EB, 64 R, 64 D

[56] References Cited

UNITED STATES PATENTS

| | | |
|---|---|---|
| 3,286,610 | 11/1966 | Fahlenberg..........................95/10 CT |
| 3,504,601 | 4/1970 | Schubert..............................95/10 CT |
| 3,527,149 | 9/1970 | Starp...................................95/10 CT |
| 3,547,018 | 12/1970 | Haberle...............................95/10 CT |
| 3,555,984 | 1/1971 | Rentschler..........................95/10 CT |

*Primary Examiner*—Joseph F. Peters, Jr.
*Attorney*—Steinberg & Blake

[57] ABSTRACT

A camera which has an electrical circuit for automatically determining exposure as well as an electrical circuit for checking the condition of a battery. A battery is common on both of these circuits, and a meter is also common to both of these circuits. The checking circuit has a normally open switch, and this switch is manually closed in order to check the battery through an indication on the meter. The exposure circuit is rendered operative by actuation of the camera shutter. A blocking mechanism is automatically operated when the normally open switch of the checking circuit is closed for blocking operation of the camera shutter so that in this way operation of the meter in connection with battery-checking operations cannot interfere with the operation thereof in connection with exposure operations.

6 Claims, 1 Drawing Figure

PATENTED MAR 7 1972
3,646,859
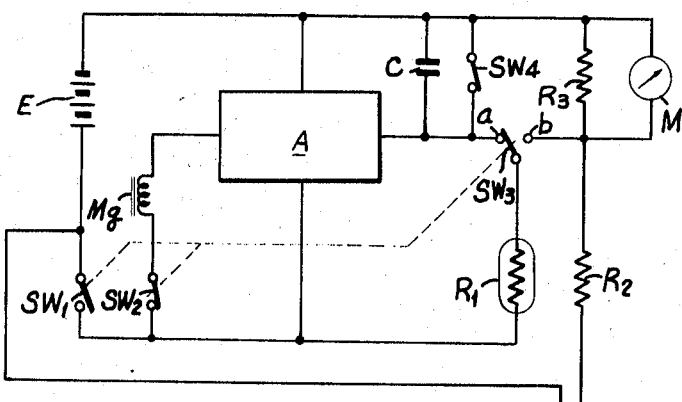
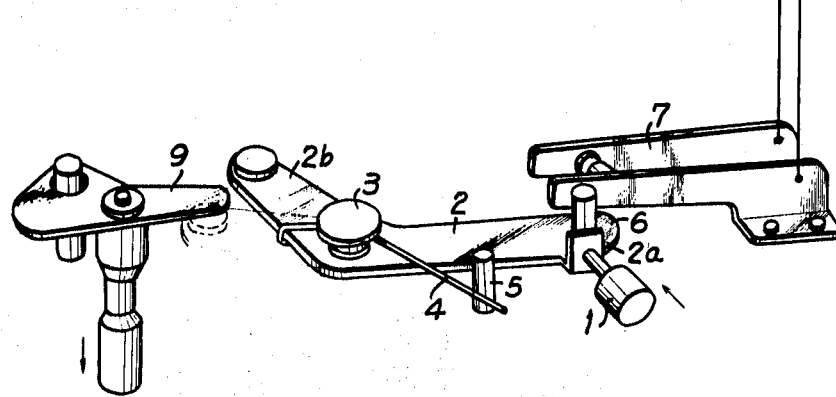
INVENTOR
YUKIO UMEMURA
BY
Steinberg and Blake
ATTORNEYS

3,646,859

CAMERA PROVIDED WITH AUTOMATIC EXPOSURE AND BATTERY-CHECKING CIRCUITS

BACKGROUND OF THE INVENTION

The present invention relates to cameras.

In particular, the present invention relates to cameras having electrical circuits for automatically determining the extent to which film in the camera is exposed, as well as an electrical circuit for determining the condition of a battery.

Known devices of this type generally include a moving coil instrument, such as a suitable galvanometer, for example, to be used selectively for indicating lighting conditions in connection with the exposure operations or for indicating the condition of a battery which is used in the exposure circuit. With devices of this type the electrical instrument has an electrical circuit for indicating the exposure value and another electrical circuit for battery-checking purposes, and both of these instrument circuits may be independent of each other. The battery-checking circuit includes a manually operable switch connected in series into the circuit and closed when it is desired to check the condition of the battery.

With such known devices, the two electrical circuits can be used simultaneously, resulting in errors in the indications provided by both circuits since the circuits are arranged dependently one upon the other. Thus if it should happen that an evaluation of exposure is made while battery-checking operations are in progress, for example during the first part of a shutter-actuating operation, there will be an erroneous exposure indication due to a careless operating error.

SUMMARY OF THE INVENTION

It is accordingly a primary object of the present invention to provide a structure which will avoid the possibility of operational errors of the above type.

In particular, it is an object of the present invention to provide a camera which will permit operation of the shutter to take place only after battery-checking operations have been completed.

Also, it is an object of the invention to provide a construction where battery-checking operations are prevented during shutter operation.

It is also an object of the present invention to provide a structure which is exceedingly simple as well as reliable in operation.

Furthermore, it is an object of the invention to provide a structure which can accomplish the above results while at the same time being compact and requiring no special manipulations to be carried out by the operator.

According to the invention the camera has an exposure circuit means for automatically determining exposure and a checking circuit means for checking the condition of a battery which is common to both of the circuit means. A meter means is also common to both of the circuit means for indicating lighting conditions when used in connection with exposure operations and for indicating battery conditions when used in connection with battery-checking operations. The checking circuit means includes a normally open switch, and a manually operable means is provided for closing this switch in order to check the condition of the battery. A shutter-actuating means is provided for rendering the exposure circuit means operative. A blocking means extends between the shutter-actuating means and the manually operable means for blocking the shutter-actuating means against operation when the manually operable means closes the normally open switch of the checking circuit means, so that in this way operation of the meter in connection with battery-checking operations cannot interfere with operation of the meter in connection with exposure operations.

BRIEF DESCRIPTION OF DRAWING

The invention is illustrated by way of example in the accompanying drawing which forms part of this application and in which a structure according to the invention is schematically presented in a perspective illustration, in connection with a schematically represented electrical circuit.

DESCRIPTION OF A PREFERRED EMBODIMENT

Referring to the drawing, it will be seen that there is illustrated therein a checking circuit means which includes a normally open switch 7 and a correcting resistance $R_2$ which are connected in series with each other. This checking circuit is electrically connected with an exposure circuit means which includes the voltage source in the form of a battery E. An instrument M is common to the exposure circuit means and the checking circuit means. This instrument M is in the form of a moving coil instrument, such as a suitable galvanometer, forming a meter which can be used on the one hand for indicating lighting conditions and on the other hand for indicating condition of the battery E.

A manually operable means is provided for selectively closing the switch 7 when it is desired to check the condition of the battery. This manually operable means includes a manually engageable member 1 fixed to and carried by a lever 2 which is supported for turning movement on a suitable pivot 3. The member 1 is fixed to the end portion 2a of the lever 2. This end portion 2a also carries a switch-actuating member 6 which is made of an electrically nonconductive material.

A spring 4 is coiled in part about the pivot pin 3 and engages an arm 2b of the lever 2 as well as a stop pin 5, for urging the lever 2 into engagement with the stationary stop pin 5. When the lever 2 is in engagement with the pin 5 the switch 7 assumes its normally open position. In order to check the condition of the battery the operator will simply push the button 1 in the direction of the arrow shown in the drawing, so as to cause the insulating element to engage and close the switch 7, the lever 2 being turned at this time in opposition to the force of the spring 4. Upon release of the button 1 the spring 4 returns the manually operable means to its rest position and the switch 7 again assumes its normally open position.

The arm 2b of the lever 2 forms a portion of a blocking means of the invention. This portion of the blocking means is thus in the form of an extension fixed to and extending from the manually operable means so as to be moved when the manually operable means is actuated to close the switch 7.

The blocking means of the invention further includes a member 9 which is fixed to the shutter-actuating means schematically represented at the lower left portion of the drawing. This shutter-actuating means takes the form of a plunger which is depressed by the operator so as to render the exposure circuit means operative. The member 9 of the blocking means is fixed to and extends from the shutter actuating means. When the latter is operated this member 9 will move downwardly along a predetermined path, as viewed in the drawing. When the manually operable means 1, 2 is actuated to close the switch 7, the portion 2b of the blocking means is automatically situated in the dot-dash line position indicated in the drawing. In this latter position the extension 2b of the lever 2 is situated directly next to and in the path of movement of the extension 9, so that if the operator should operate the shutter-actuating means when the switch 7 has been closed, this portion 9 of the blocking means will, by its engagement with the portion 2b of the blocking means, prevent the shutter-actuating means from being operated. In this way the blocking means of the invention functions to prevent shutter-actuation when the manually operable means is manipulated to carry out battery-checking operations.

As an example of an exposure circuit means, there is illustrated in the drawing the circuit which includes the battery E, as well as a conventional switching circuit A and an electromagnet Mg. The photoelectric converter element $R_1$ will in a known way sense the light intensity and convert it to a resistance whose magnitude is indicative of the lighting intensity with this resistance being used in the circuit for control purposes. A resistor $R_3$ is connected in series with the resistor $R_2$ and in parallel with the meter means M and functions as a detecting resistance both for output and for input. A capacitor C receives a charge the magnitude of which is in accordance with the required exposure and a switch $SW_1$ is provided for connecting the power source E into the circuit. This latter switch is operated when the shutter-actuating means is operated. A magnet switch $SW_2$ is also provided, and in addition there is a changeover switch $SW_3$, which is also actuated in response to operation of the shutter-actuating means. The circuit also includes a timing switch $SW_4$. The switches $SW_1$, $SW_2$ and $SW_3$ normally assume the condition shown in the drawing, and they are interconnected so as to operate in a given manner as a result of their interconnection. The meter M will indicate whether the lighting conditions are proper for automatic exposure, and the charge on the capacitor C will act through the switching circuit A and the electromagnet Mg in order to provide for closing of the shutter after a proper exposure has been made.

Thus, with the above structure, assuming that the parts are in the position illustrated, where the switches $SW_1$, $SW_2$, and $SW_3$ are in a nonoperative state, the manually operable means may be manipulated by pushing the button 1, so that the lever 2 turns in opposition to the spring 4, and the switch 7 is closed. In this way the checking circuit means is rendered operative to indicate the condition of the battery through the correcting resistance $R_2$ and the parallel circuit portion which includes the instrument M and the resistance $R_3$. It is thus possible in this way to confirm through the extent of deflection of the meter means M whether the power source E is in a proper condition for providing an effective voltage for purposes of determining automatically the exposure time.

At this time the blocking portion 2b of the blocking means is in the path of movement of the blocking portion 9 thereof so as to prevent operation of the shutter-actuating means.

Upon release of member 1, the spring 4 returns the parts to the positions shown in the drawing, thus enabling the switch 7 again to assume its normally open position, and simultaneously the blocking portion 2b of the lever 2 is retracted beyond the range of movement of the blocking portion 9 which is operatively connected with the shutter-actuating means. Therefore, whenever the checking circuit means is not operative there is no prevention of operation of the shutter-actuating means.

Thus with the structure of the invention when the meter M indicates the condition of the voltage source E, with the checker circuit means closed, the shutter-actuating means is reliably blocked against operation by the portion 2b of the blocking means, so that it is possible to avoid an erroneous operation according to which the meter M is used for indicating the exposure conditions as well as for indicating battery condition as a result of operation of the shutter-actuating means when the switch 7 is closed, thus avoiding an erroneous measurement of the voltage source and an erroneous indication of lighting conditions according to which the indication given by the meter M will indicate that there is a lesser amount of light available than is actually present. In other words with known structures it is possible to simultaneously operate both circuits, resulting in an indication by the meter means M that the amount of exposure is slightly less than that which is required for shutter release.

It is furthermore to be noted that with the structure of the invention when the shutter-actuating means is operated the blocking portion 9 becomes situated in the path of turning of the blocking portion 2b, so that if the manually operable means 1,2 is manipulated during operation of the shutter-actuating means, the blocking means will also function to effectively prevent closing of the switch 7, and thus an erroneous exposure indication is also reliably avoided since with this arrangement the extension 2b of the lever 2 cannot enter into the path of movement of the member 9 and the manually operable means is effectively blocked against operating the checking circuit.

Thus, with the structure of the invention a concurrent operation of the exposure circuit means and checking circuit means is reliably prevented. Thus there can be no erroneous measurement in connection with shutter operation or in connection with battery checking. Furthermore, the exceedingly simple structure of the invention minimizes the possibility of faulty operation and achieves an exceedingly low manufacturing cost.

What is claimed is:

1. In a camera, exposure circuit means for determining the extent to which film in the camera is exposed, checking circuit means for checking the condition of a battery, a battery electrically connected with and common to both of said circuit means, meter means electrically connected with and common to both of said circuit means for indicating exposure conditions when used with said exposure circuit means and for indicating battery condition when used with said checking circuit means, a normally open switch-forming part of said checking circuit means for rendering said checking circuit means operative only when said normally open switch is closed, shutter-actuating means for rendering said exposure circuit means operative when said shutter-actuating means is operated, manually operable means coacting with said normally open switch for closing the latter when said checking circuit means is to be rendered operative, and blocking means extending between and operatively connected with said shutter-actuating means and manually operable means for blocking operation of said shutter-actuating means when said manually operable means is manipulated to close said normally open switch, so that use of said meter means in connection with battery-checking operations cannot interfere with use of said meter means in connection with exposure operations.

2. The combination of claim 1 and wherein said blocking means has a pair of portions respectively connected with said manually operable means and said shutter-actuating means, and said portion thereof which is connected with said shutter-actuating means also blocking operation of said manually operable means when said shutter-actuating means is operated.

3. The combination of claim 1 and wherein said blocking means includes a pair of blocking portions respectively connected operatively with said shutter-actuating means and said manually operable means, and said blocking portion which is connected with said manually operable means being displaced by the latter into the path of movement of the blocking portion connected with said shutter-actuating means when said manually operable means closes said normally open switch, for preventing actuation of said shutter-actuating means when said normally open switch is closed.

4. The combination of claim 3 and wherein said blocking portion operatively connected with said shutter-actuating means is situated in the path of movement of said blocking portion operatively connected with said manually operable means when said shutter-actuating means is operated, for preventing operation of said manually operable means and closing of said normally open switch when said shutter-actuating means is operated.

5. The combination of claim 3 and wherein said blocking portion operatively connected to said shutter-actuating means is in the form of a member fixed to and extending from said shutter-actuating means, and said manually operable means being in the form of a lever turnable about a given axis from a rest position to an operative position closing said normally open switch, said blocking portion connected to said manually operable means including an extension of said lever which is displaced into the path of movement of said member extending from said shutter-actuating means when said lever is turned for closing said normally open switch.

6. The combination of claim 5 and wherein a spring is operatively connected with said lever for urging the latter to a rest position where said normally open switch remains open.

* * * * *